United States Patent
Natanzon

(10) Patent No.: US 8,370,648 B1
(45) Date of Patent: Feb. 5, 2013

(54) WRITING AND READING ENCRYPTED DATA USING TIME-BASED ENCRYPTION KEYS

(75) Inventor: Assaf Natanzon, Ramat-Gan (IL)

(73) Assignee: EMC International Company, Hamilton (BM)

( * ) Notice: Subject to any disclaimer, the term of this patent is extended or adjusted under 35 U.S.C. 154(b) by 396 days.

(21) Appl. No.: 12/724,005

(22) Filed: Mar. 15, 2010

(51) Int. Cl.
*H04L 29/06* (2006.01)

(52) U.S. Cl. .................. 713/193; 713/189; 380/277

(58) Field of Classification Search .......... 713/193, 713/189; 380/277
See application file for complete search history.

(56) References Cited

U.S. PATENT DOCUMENTS

| | | | |
|---|---|---|---|
| 6,317,829 B1* | 11/2001 | Van Oorschot | 713/155 |
| 7,137,114 B2* | 11/2006 | Rich et al. | 717/174 |
| 2001/0018736 A1* | 8/2001 | Hashimoto et al. | 713/1 |
| 2002/0002466 A1* | 1/2002 | Kambayashi et al. | 705/1 |
| 2002/0097878 A1* | 7/2002 | Ito et al. | 380/277 |
| 2002/0103964 A1* | 8/2002 | Igari | 711/112 |
| 2002/0120576 A1* | 8/2002 | Yamada et al. | 705/57 |
| 2002/0144129 A1* | 10/2002 | Malivanchuk et al. | 713/188 |
| 2002/0150245 A1* | 10/2002 | Sugimoto et al. | 380/201 |
| 2003/0041221 A1* | 2/2003 | Okada | 711/164 |
| 2003/0149854 A1* | 8/2003 | Yoshino et al. | 711/173 |
| 2003/0182565 A1* | 9/2003 | Nakano et al. | 713/193 |
| 2003/0188117 A1* | 10/2003 | Yoshino et al. | 711/164 |
| 2004/0117467 A1* | 6/2004 | Rich et al. | 709/223 |
| 2004/0147246 A1* | 7/2004 | Kim | 455/411 |
| 2005/0123142 A1* | 6/2005 | Freeman et al. | 380/277 |
| 2006/0069925 A1* | 3/2006 | Nakai et al. | 713/193 |
| 2006/0071951 A1* | 4/2006 | Walmsley et al. | 347/5 |
| 2006/0159424 A1* | 7/2006 | Hu et al. | 386/94 |
| 2006/0190410 A1* | 8/2006 | Harper | 705/59 |
| 2006/0212399 A1* | 9/2006 | Akiyama | 705/50 |
| 2006/0248346 A1* | 11/2006 | Shiomi et al. | 713/184 |
| 2007/0033419 A1* | 2/2007 | Kocher et al. | 713/193 |
| 2007/0043769 A1* | 2/2007 | Kasahara et al. | 707/104.1 |
| 2007/0064936 A1* | 3/2007 | Kasahara et al. | 380/45 |
| 2007/0074148 A1* | 3/2007 | Morgan | 717/101 |
| 2007/0140481 A1* | 6/2007 | Parameswaran Rajamma | 380/37 |
| 2007/0189517 A1* | 8/2007 | Koseki et al. | 380/30 |
| 2008/0065891 A1* | 3/2008 | Karamchedu et al. | 713/171 |
| 2008/0086646 A1* | 4/2008 | Pizano | 713/189 |
| 2008/0154775 A1* | 6/2008 | Soukup | 705/51 |

\* cited by examiner

*Primary Examiner* — Edan Orgad
*Assistant Examiner* — Bradley Holder
(74) *Attorney, Agent, or Firm* — Daly, Crowley, Mofford & Durkee, LLP

(57) ABSTRACT

In one aspect, a method to manage encrypted data includes configuring a first portion of a storage medium to store encrypted data. The encrypted data is encrypted using a time-based encryption key. The method also includes configuring a second portion of the storage medium to include metadata identifying the time-based encryption key and storing the time-based encryption key in a location other than the storage medium.

11 Claims, 5 Drawing Sheets

WRITING AND READING ENCRYPTED DATA USING TIME-BASED ENCRYPTION KEYS

BACKGROUND

Data is generally encrypted to prevent access by unauthorized individuals. Typically, the data is encrypted using a key. In order for the encrypted data to be read, it must be unencrypted using the key. Thus, for example, if a laptop is stolen, data stored on its hard drive cannot be accessed by a perpetrator unless the key is used. To delete encrypted data typically all of the data is rewritten with 1s and 0s, which is typically repeated a number of times.

SUMMARY

In one aspect, a method to manage encrypted data includes configuring a first portion of a storage medium to store encrypted data. The encrypted data is encrypted using a time-based encryption key. The method also includes configuring a second portion of the storage medium to include metadata identifying the time-based encryption key and storing the time-based encryption key in a location other than the storage medium.

In another aspect, an article includes a machine-readable medium that stores executable instructions to manage encrypted data. The instructions cause a machine to configure a first portion of a storage medium to store encrypted data. The encrypted data is encrypted using a time-based encryption key. The machine-readable medium further includes instructions that cause the machine to configure a second portion of the storage medium to include metadata identifying the time-based encryption key and to store the time-based encryption key in a location other than the storage medium. The location is at least one of a cache and a server. The storage medium includes one of a logical unit, a disk drive and a track storage.

In a further aspect, an apparatus, to manage encrypted data, includes circuitry to configure a first portion of a storage medium to store encrypted data. The encrypted data is encrypted using a time-based encryption key. The apparatus also includes circuitry to configure a second portion of the storage medium to include metadata identifying the time-based encryption key; and to store the time-based encryption key in a location other than the storage medium. The location is at least one of a cache and a server. The storage medium includes one of a logical unit, a disk drive and a track storage.

DETAILED DESCRIPTION

Described herein is an approach to encrypt data that will allow easier maintenance of encrypted data. For example, data may be deleted by simply deleting an encryption key rather than deleting the actually data. While the data described herein is described with a logical unit (LUN), the techniques described herein may be used with file system storage or track storage.

Figures 1, 2A, 2B:
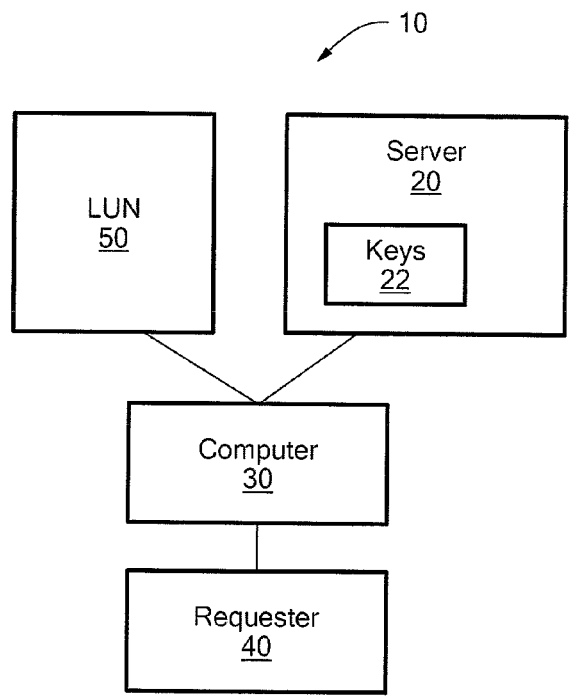
FIG. 1 is a block diagram of a storage system.
FIG. 2A is a block diagram of an encrypted logical unit (LUN).
FIG. 2B is a block diagram of the encrypted LUN after data has been updated.

Referring to FIG. 1 an encryption storage system 10 includes a key server 20 (e.g., a RSA® Key Manager (RKM)) that stores encryption keys 22, a computer 30, a requestor 40 and an encrypted logical unit (LUN) (50). The requestor 40 may be an application, a user or a system that requests access to encrypted data, to encrypt data, delete encrypted data, control access to encrypted data and so forth. In one example, the encryption LUN 50 encrypts/decrypts data. The LUN 50 accesses the key server 20 to retrieve the encryption key (e.g., one of the keys 22) for encrypting/decrypting the data.

As used herein, the encryption keys 22 are time-based encryption keys and are useable to encrypt and/or decrypt for a predetermined time period. For example, after the predetermined amount of time a new key is used to encrypt data. In one particular example, a new encryption key is used each week to encrypt data. In one example, the time-based encryption keys are updated based on a policy.

Referring to FIG. 2A, the encrypted LUN 50 includes data blocks (e.g., data block 0 (52a), data block 1 (52b), data block 2 (52c) and data block 3 (52d)). Each data block includes a first portion and a second portion. For example, data block 0 (52a) includes a first portion 54a and a second portion 58a; data block 1 (52b) includes a first portion 54b and a second portion 58b; data block 2 (52c) includes a first portion 54c and a second portion 58c; and data block 3 (52d) includes a first portion 54d and a second portion 58d.

The first portion 54a-54d is configured to store encrypted data and the second portion is configured to store an ID of a key (key ID) used to encrypt the data in the first portion. For example, encryption key 1 is identified as key ID 1. It is important to emphasize that the actual key to encrypt the data in the data block is stored elsewhere. For example, the keys 22 are stored on the server 20. In one example, data block 0 (52a) includes encrypted data W in the first portion 54a and a key ID 1 in the second portion 58a; data block 1 (52b) includes encrypted data X in the first portion 54b and a key ID 2 in the second portion 58b; data block 2 (52c) includes encrypted data Y in the first portion 54c and a key ID 2 in the second portion 58c; and data block 3 (52d) includes encrypted data Z in the first portion 54d and a key ID 3 in the second portion 58d.

Referring to FIG. 2B, in one example, the data in data block 0 (52a) is updated with encrypted data W' in the first portion 54a. In one example, the old key, key 1, is expired and no longer useable. In other examples, the old key, key 1, is not expired (e.g., the key 1 may be valid to read encrypted data), but it is not the newest key. The encrypted data W' is encrypted with a new key, for example, key 4. The ID of key 4, Key ID 4, is stored in the second portion 58a of data block 0 (52a) to identify the key that encrypted the data in data block 0 (52a).

In one example, the Key IDs may be stored immediately after the data itself is stored. For instance, in a storage system (e.g., the LUN 50) where each sector has 520 bytes instead of 512 bytes per sector, the key ID can be stored in some of the last 8 bytes of the sector. In other examples, the key ID may be stored in a special area of the LUN.

Figure 3:
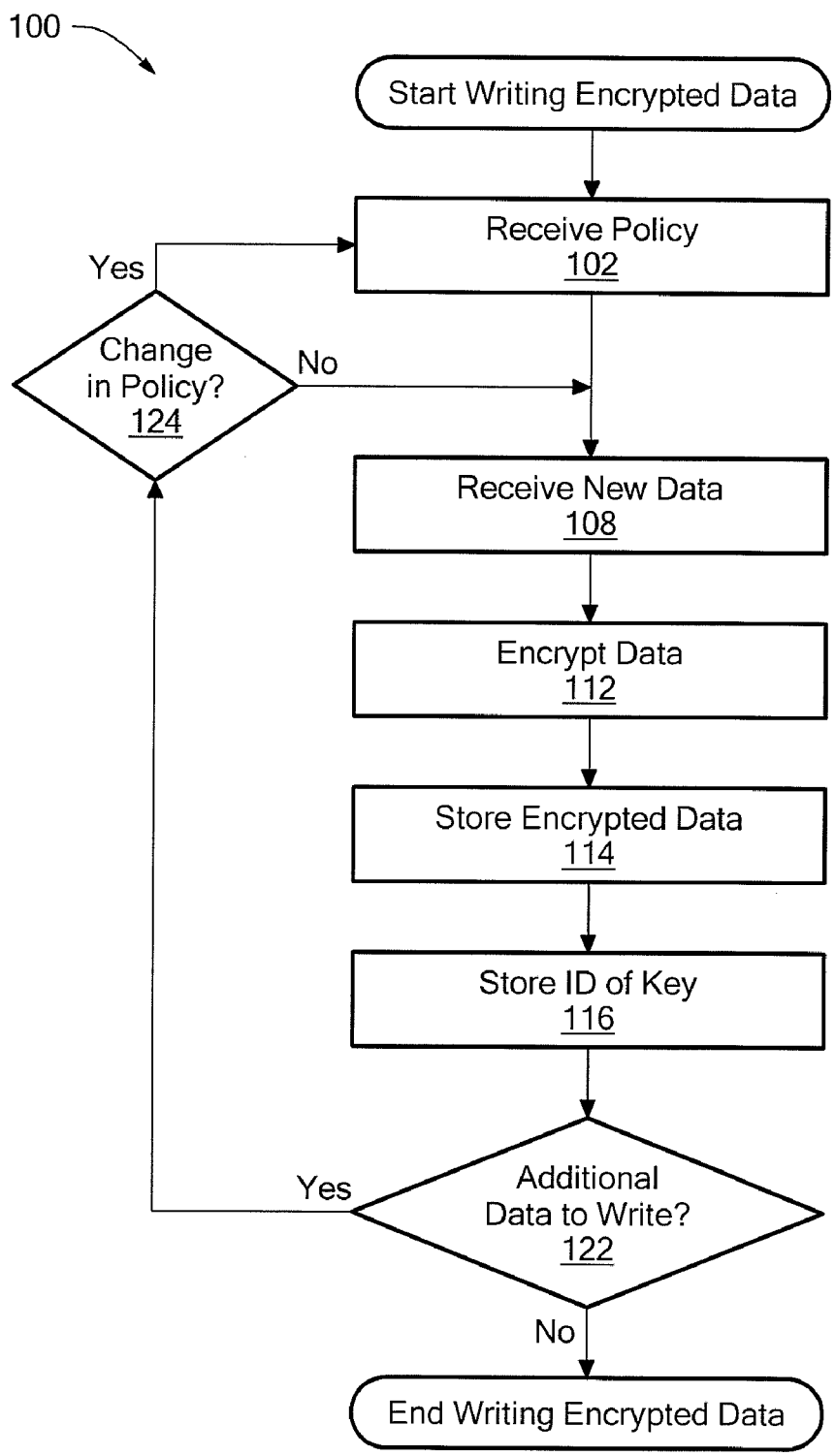
FIG. 3 is a flowchart of an example of a process to write encrypted data.

Referring to FIG. 3, one example of a process to store encrypted data is a process 100. A policy is received (102). For example, a policy may be a write policy. In particular, the write policy may require that encryption keys are updated on a periodic basis.

New data is received to be encrypted (108). The data is encrypted (112) using the appropriate key and stored (114). For example, data W is encrypted using key 1 and stored in the first portion 54a of data block 0 (52a) (FIG. 2A).

The ID of the key is stored. For example, if the data W is encrypted using key 1 and stored in the first portion 54a of data block 0 (52a) then the ID of the key, key ID 1, is stored in the second portion 58a of data block 0 (52a) (FIG. 2A).

If there are additional writes (i.e., data to be encrypted and stored) it is determined if there is a change in policy (124). If there is not a change in policy, then processing blocks 108, 112, 116 and 122 are repeated. If there is a change in policy, a new policy is received (102) and processing blocks 108, 112, 116 and 122 are repeated using the new policy.

Figure 4:
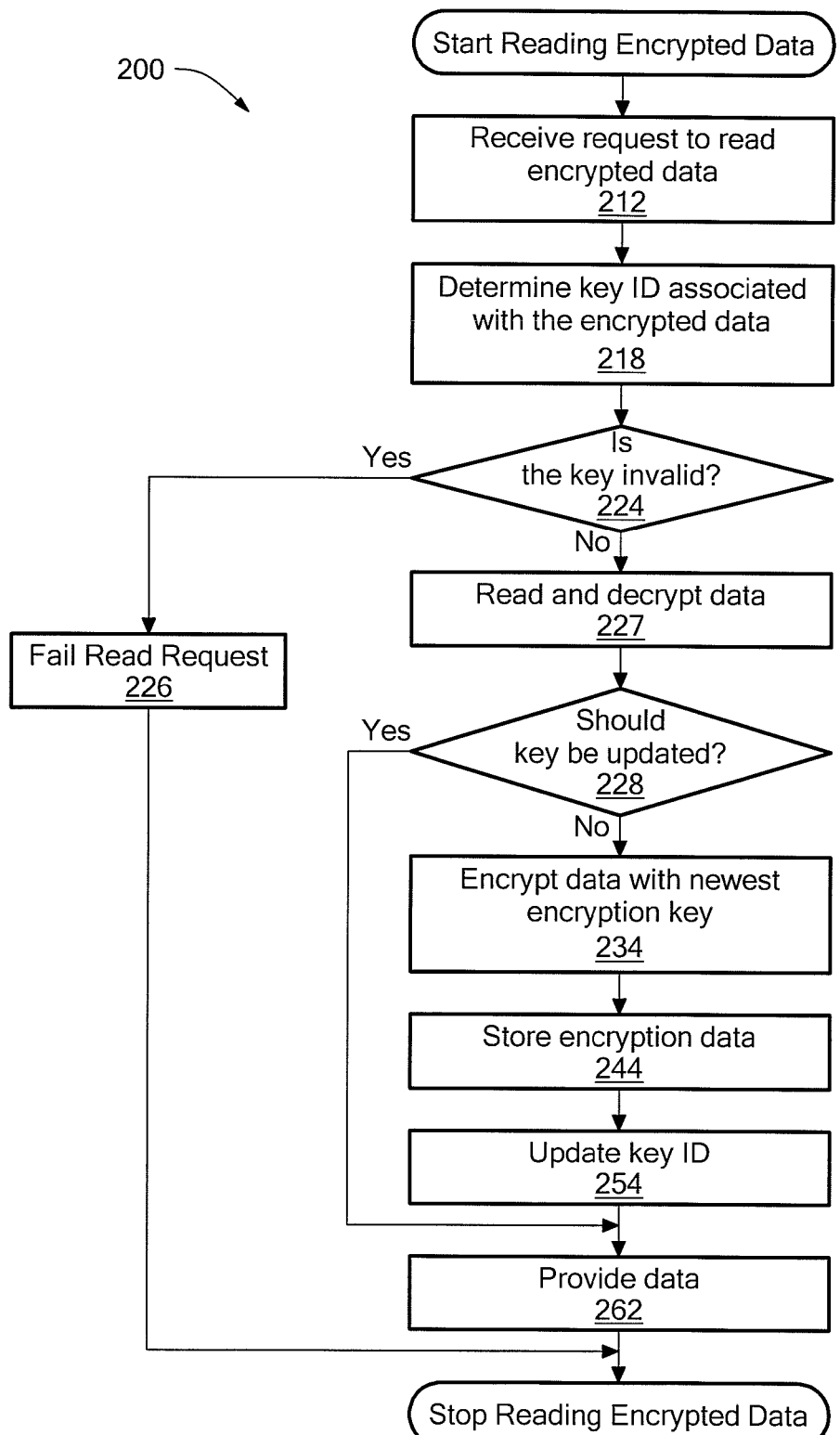
FIG. 4 is a flowchart of an example of a process to read encrypted data.

Referring to FIG. 4, one example of a process to read encrypted data is a process 200. A request is received to read encrypted data (212). The key ID associated with the key used to encrypt the data is determined (218) and used to decrypt the data so it may be read. For example, if a request to read data block 1 (52b) of LUN 50 is received, then it is determined that the key ID is key ID 1 so that key 1 is used to decrypt data W (see FIG. 2A). In one example, the encryption key is requested from the key server 20.

In another example, the storage system 10 may cache keys in a cache (e.g., in a key cache 540 (FIG. 6)) so it will not have to access the key server 20 on every IO, but periodically. The storage system 10 will access the key server to get a new key policy, and if a key was erased the storage system 10 will erase it from the cache. In one example, the storage system 10 stores encryption keys in the cache in a volatile memory (e.g., volatile memory 524 (FIG. 6)).

Because of the time-based nature of updating the keys, some keys may be valid but not the newest key and some keys are so old that there are invalid. For example, there are at least three types of encryption keys used to read encrypted data. One type is a latest (e.g., newest, current) type key available. With the latest type key, the encrypted data is decrypted using the latest key and provided, for example, to the user when the user requests a read. Another type key is a valid but older type key (e.g., the key is valid for reading encrypted data but is older than allowed by a policy and is no longer used for encrypting new data). In this case, data is encrypted with the new key instead and stored but the unencrypted data is still provided, for example, to the user. A still further type key is an invalid type key. The invalid type key is a key that has been erased from the server 22 or has expired. In this case, using an invalid key will result in the read request failing, since storage cannot decrypt the data.

Process 300 will determine if the encryption key is invalid (224). If the key is invalid, the read request will fail (226).

If the key is not invalid, then process 300 will read and decrypt the data (227). Process 300 determines if the key needs updating based on a refresh policy (228). For example, even though keys used to encrypt data are updated once a week, in reading encrypted data, the refresh policy may require that keys used to read encrypted data be refreshed (updated) to the newest key only once a month. If the key does not need updating (refreshing), then the data is provided (262), for example, as a read IO.

If the key is not the newest key, for example, the encryption key is outdated based on a policy (e.g., keys older than a month are updated), then the key is updated on a read request based on the policy, the data is decrypted using the old key then re-encrypted with the latest encryption key (e.g., a newer encryption key than an outdated encryption key) (234), the new encrypted data is stored back to the LUN 50 (244) and the key ID is updated to reference the new encryption key (254).

In one example, processing blocks 234, 244 and 245 are performed before acknowledging the read (262).

Figure 5:
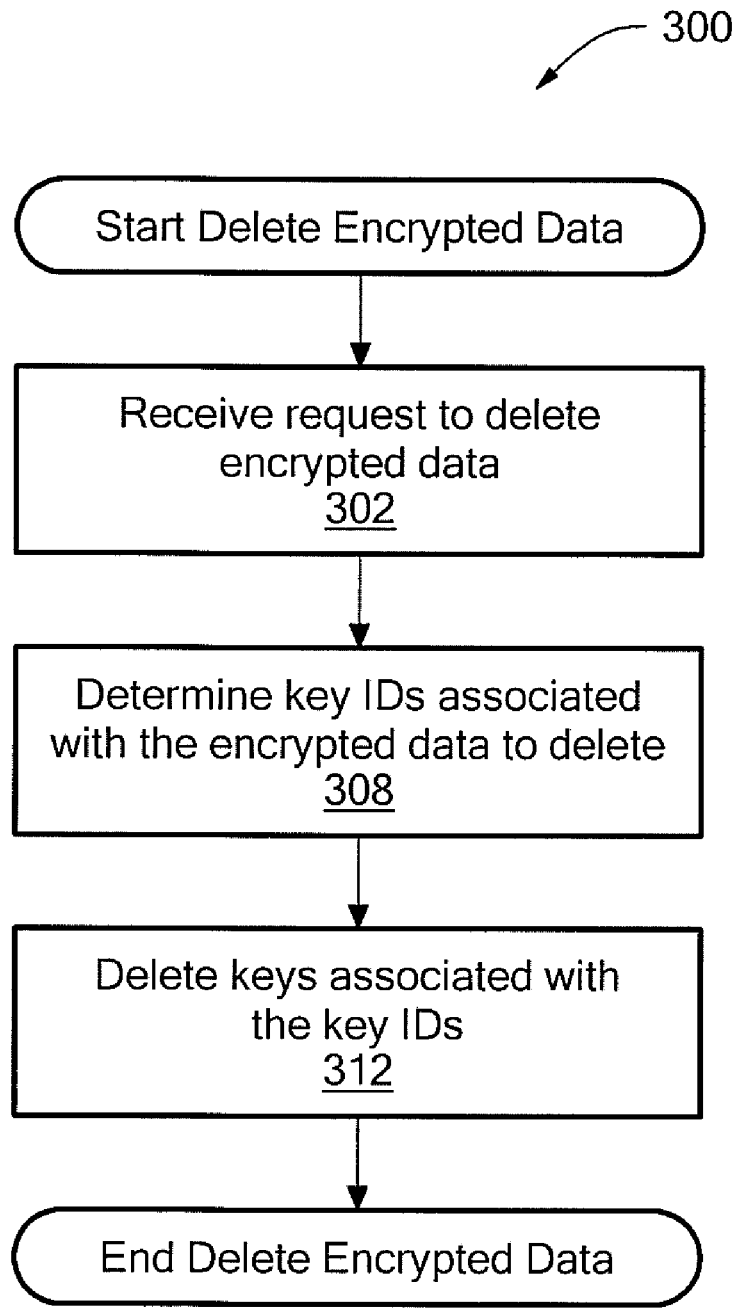
FIG. 5 is a flowchart of an example of a process to delete encrypted data.

Referring to FIG. 5, one example of a process to delete encrypted data is a process 300. A request is received to delete encrypted data (302). The keys IDs associated with the encrypted data are determined (308). Keys associated with the key IDs are deleted (312).

For example, a request will be to erase all data older then a specific time. In one particular example, a regulation (e.g., a retention policy) may require deletion of all data older then 7 years so that process 300 will erase all older keys. The encryption keys are deleted from the key server 20, and on a periodic update the storage system will erase their keys from the memory. If a user had access to an old encryption key, when the data that used the old encryption key is changed to use a newer encryption key the user will not be able to read the newer data even if the user takes the physical spindles out of the storage system.

While a LUN is described herein other data storage environments may be used. For example, a file system may be used wherein a metadata file that includes a key ID of the key used to encrypt the data may be stored together with the encrypted data file. In one particular example, a portable storage drive includes an encrypted data file and another file includes the key ID. In another example, a track storage system may be used so that for each track or a number of tracks that includes data encrypted by an encryption key another track stores the key ID identifying the encryption key used to encrypt the data. In a further example, like in an EMC® SYMMETRIX® Storage system for example, the minimum encryption portion may be a track of 64 KB, so that each track will have a key ID attached to it, and the key ID may be kept in a cache.

Figure 6:
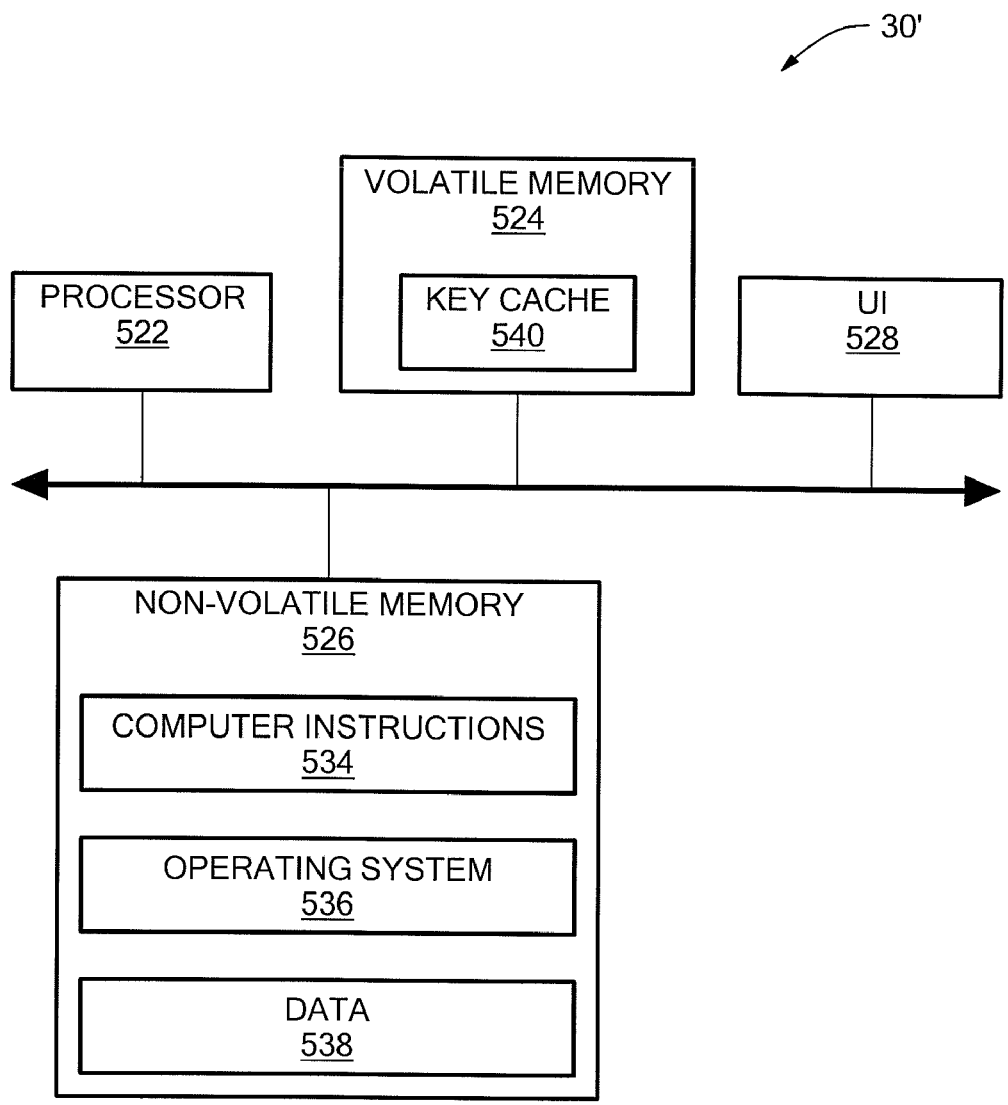
FIG. 6 is a computer on which any of the processes of FIGS. 3 to 5 may be implemented.

Referring to FIG. 6, an example of the computer 30 is a computer 30'. The computer 30' includes a processor 522, a volatile memory 524, a non-volatile memory 528 (e.g., hard disk) and a user interface (UI) 528 (e.g., a mouse, a keyboard, a display, touch screen and so forth). The non-volatile memory 524 stores computer instructions 534, an operating system 536 and data 538. The volatile memory includes the key cache 540 to store a copy of encryption keys located on the server 20. In one example, the computer instructions 534 are executed by the processor 522 out of volatile memory 524 to perform all or part of the processes described herein (e.g., processes 100, 200, 300, 400, 500).

The processes described herein (e.g., processes 100, 200, 300, 400, 500) are not limited to use with the hardware and software of FIG. 6; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes.

The processes described herein are not limited to the specific embodiments described. For example, the processes 100, 200, 300, 400 and 500 are not limited to the specific processing order of FIGS. 3 to 5, respectively. Rather, any of the processing blocks of FIGS. 3 to 5 may be re-ordered, combined or removed, performed in parallel or in serial, as necessary, to achieve the results set forth above.

The processing blocks in FIGS. 3 to 5 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method to manage encrypted data, comprising:
   configuring a first portion of a computer storage medium to store encrypted data, the encrypted data being encrypted using a time-based encryption key;
   configuring a second portion of the storage medium to include metadata identifying the time-based encryption key;
   storing the time-based encryption key in a location separately from the encrypted data and the metadata other than the storage medium, the location being at least one of a cache and a server;
   receiving a request to store data as encrypted data;
   encrypting the data using the time-based encryption key;
   storing the encrypted data in the first portion of the storage medium;
   generating the metadata to identify the time-based encryption key;
   storing the metadata in the second portion of the storage medium;
   receiving a request to read the encrypted data;
   accessing the metadata to determine the time-based encryption key;
   decrypting the encrypted data using the time-based encryption key;
   receiving a request to delete the encrypted data;
   determining metadata associated with the encrypted data;
   determining a time-based encryption key associated with the metadata associated with the encrypted data; and
   deleting the time-based encryption key associated with the metadata associated with the encrypted data to satisfy the request to delete the encrypted data,
   wherein the storage medium comprises one of a logical unit, a disk drive and a track storage.

2. The method of claim 1, further comprising:
   reading the metadata;
   determining the time-based encryption key is expired based on a retention policy;
   decrypting the encrypted data; and
   encrypting the decrypted data with a new time-based encryption key if the time-based encryption key is expired.

3. The method of claim 1, further comprising:
   reading the metadata;
   determining if the time-based encryption key was erased; and
   failing a read request if the time-based encryption key was erased.

4. The method of claim 1 wherein the time-based encryption key is updated after a predetermined amount of time based on a policy.

5. An article comprising:
   a non-transitory machine-readable medium that stores executable instructions to manage encrypted data, the instructions causing a machine to:
   configure a first portion of a storage medium to store encrypted data, the encrypted data being encrypted using a time-based encryption key;
   configure a second portion of the storage medium to include metadata identifying the time-based encryption key; and
   store the time-based encryption key separately from the encrypted data and the metadata in a location other than the storage medium, the location being at least one of a cache and a server;
   receive a request to store data as encrypted data;
   encrypt the data using the time-based encryption key;
   store the encrypted data in the first portion of the storage medium;
   generate the metadata to identify the time-based encryption key;
   store the metadata in the second portion of the storage medium;
   receive a request to read the encrypted data;
   access the metadata to determine the time-based encryption key;
   decrypt the encrypted data using the time-based encryption key;
   receive a request to delete the encrypted data;
   determine metadata associated with the encrypted data;
   determine a time-based encryption key associated with the metadata associated with the encrypted data; and
   delete the time-based encryption key associated with the metadata associated with the encrypted data to satisfy the request to delete the encrypted data,
   wherein the storage medium comprises one of a logical unit, a disk drive and a track storage.

6. The article of claim 5, further comprising instructions to:
   read the metadata;
   determine if the time-based encryption key is expired based on a retention policy;
   decrypt the encrypted data; and
   encrypting the decrypted data with a new time-based encryption key if the time-based encryption key is expired.

7. The article of claim 5, further comprising instructions to:
read the metadata;
determine if the time-based encryption key was erased; and
fail a read request if the time-based encryption key was erased.

8. An apparatus to manage encrypted data, comprising:
circuitry to:
configure a first portion of a storage medium to store encrypted data, the encrypted data being encrypted using a time-based encryption key;
configure a second portion of the storage medium to include metadata identifying the time-based encryption key; and
store the time-based encryption key separately from the encrypted data and the metadata in a location other than the storage medium, the location being at least one of a cache and a server;
receive a request to store data as encrypted data;
encrypt the data using the time-based encryption key;
store the encrypted data in the first portion of the storage medium;
generate the metadata to identify the time-based encryption key;
store the metadata in the second portion of the storage medium;
receive a request to read the encrypted data;
access the metadata to determine the time-based encryption key;
decrypt the encrypted data using the time-based encryption key;
receive a request to delete the encrypted data;
determine metadata associated with the encrypted data;
determine a time-based encryption key associated with the metadata associated with the encrypted data; and
delete the time-based encryption key associated with the metadata associated with the encrypted data to satisfy the request to delete the encrypted data,
wherein the storage medium comprises one of a logical unit, a disk drive and a track storage.

9. The apparatus of claim 8 wherein the circuitry comprises at least one of a processor, a memory, programmable logic and logic gates.

10. The apparatus of claim 8, further comprising circuitry to:
read the metadata;
determine if the time-based encryption key is expired;
decrypt the encrypted data; and
encrypting the decrypted data with a new time-based encryption key if the time-based encryption key is expired.

11. The apparatus of claim 8, further comprising circuitry to:
read the metadata;
determine if the time-based encryption key was erased; and
fail a read request if the time-based encryption key was erased.

* * * * *